Oct. 9, 1956

F. C. ROISSARD 2,766,068

BOXES OR CONTAINERS

Filed Sept. 25, 1953

INVENTOR
FERNANDO CUILLERY ROISSARD
BY
Howard E Thompson Jr
ATTORNEY

United States Patent Office 2,766,068
Patented Oct. 9, 1956

2,766,068
BOXES OR CONTAINERS

Fernando Cuillery Roissard, Mexico City, Mexico, assignor to Airkem, Inc., New York, N. Y., a corporation of New York Application September 25, 1953, Serial No. 382,411

2 Claims. (Cl. 299—24)

This invention relates generally to boxes or containers and especially to boxes or containers to be used as receptacles for deodorants, insecticides, disinfectants, and the like. More particularly, the invention relates to improved boxes or containers of the class described which provide a circular container of adjustable aperture or opening suitable for use with chlorophyll gels and in general for deodorant substances, insecticides, disinfectants, and the like, whether in the form of gel, paste, compacts, crystals, or other suitable form.

The container of the present invention is characterized substantially in that it is provided with means for uncovering it gradually or completely while maintaining the cover part and receptacle part in associated relationship, thus avoiding inadvertent displacement of the cover part and keeping it readily available for closing the container to preserve the substance therein; and further characterized in that the cover part is adjustable with respect to the receptacle part for regulation of the evaporation or volatilization of the substance from said receptacle.

More particularly, the container of the present invention is characterized as comprising the circular receptacle part provided at its center with a tubular inwardly threaded part which is integral with the bottom of the receptacle; in combination with a cover part in the form of a disc with a peripheral flange and having at its center a threaded pin or stud adapted to be screwed into the tubular part of the receptacle either from above or from below. In this combination inter-engaging means is provided on peripheral edges of said receptacle and cover flange for providing a substantial seal of said container in the closed position of said cover.

These and other details, characteristics and advantages of the box or container in accordance with the present invention will be clearly evident from a consideration of the following description, together with the accompanying drawing indicating one adaptation of my invention, wherein the various parts thereof are identified by suitable reference characters in each of the views, and wherein.

Figure 2:
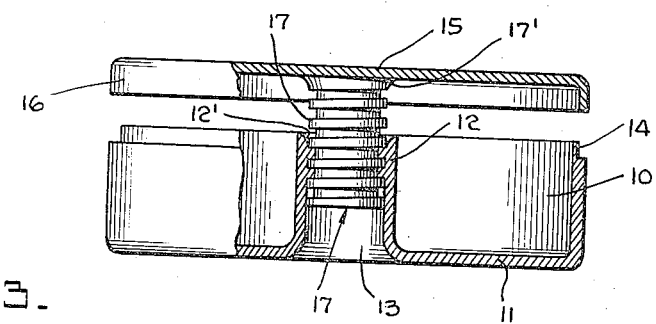
Fig. 2 is an elevation view similar to Fig. 1, but partially uncovered and partially in vertical section to show its inner construction.
Figure 4:
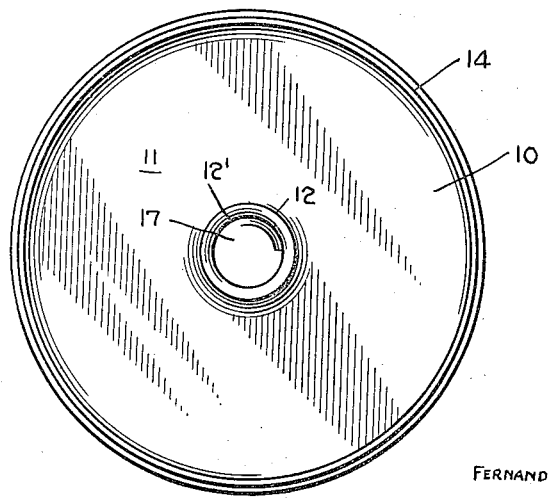
Fig. 4 is a plan view of the uncovered container as shown in Fig. 3.

As shown in the drawing, the present container comprises a circular, relatively wide and low receptacle 10 at the center of the bottom 11 of which I have provided a tubular piece 12 provided with internal screw threads in a bore which passes through the receptacle as a central and circular opening 13 which is more fully shown in Figs. 2 and 4 of the drawing. The tubular part 12 is made integral with the bottom 11 of the receptacle and is arranged perpendicular thereto, its height being no greater than that of the edge of said receptacle. The edge of the receptacle 10 is provided with a peripheral recess 14 for the reception of a cover flange as hereinafter described. The internal thread of the tubular part 12 may extend downwardly to its middle portion, or if desired, may extend substantially throughout the entire length of the tubular part.

Figure 1:
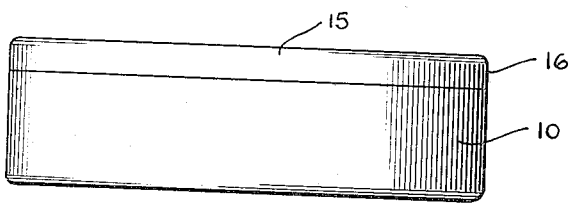
Fig. 1 is a view in elevation of a container in accordance with the invention showing the same completely covered.

The cover 15 of the container is provided with a rim or flange 16 which is adapted to register with the recess 14 of the receptacle to effect a tight seal or closure when the parts are in assembled position. Centrally of the cover 15 and arranged perpendicularly to its surface is a threaded pin or stud 17 adapted for close rotatable engagement with the threaded tubular part 12 of the receptacle 10. The length of this pin or stud 17 can be varied to a considerable extent, but should be slightly less than the height of said receptacle in order that in the assembled position, as shown in Fig. 1, the pin or stud 17 will not protrude below the lower surface of the receptacle bottom 11.

The upper inner periphery of the tubular part 12 is preferably rounded as seen at 12' to correspond with the rounded portion or fillet 17' between the threaded pin 17 and the cover 15; and the contours of the rounded portion 12' and 17' are preferably such as to provide close interfitting relation therebetween when the cover is in closed position on said receptacle.

Figure 3:
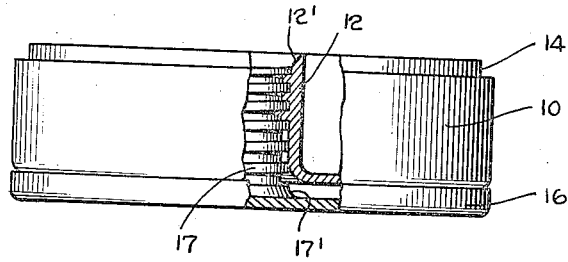
Fig. 3 is another view in elevation of the container as shown in Figs. 1 and 2, but with the cover associated with the bottom of the receptacle and with the top of the receptacle fully uncovered.

When the receptacle 10 is filled with chlorophyll gelatine or with other suitable forms of deodorant insecticide or disinfectant materials, the cover when in its lowermost closed position provides an effective seal of the container both at the periphery thereof and around the pin or stud 17 so that the materials can be retained therein without substantial loss due to volatilization for extended periods of time. When it is desired to put to use the material within the receptacle 10, one merely rotates the cover 15 to unscrew the pin or stud 17 from the tubular part 12 until the upper edge of the container 10 and the flange 16 of the cover are spaced apart a distance to provide the desired volatilization of material from the receptacle. The more the cover is raised by rotating the same, the greater volatilization of substance from within the receptacle, and if maximum volatilization is desired, the cover can be completely removed from the top of the receptacle and screwed into the bottom of the receptable as shown in Fig. 3 of the drawing. When in this arrangement it will be apparent that inadvertent displacement of the cover is avoided and at the same time the assemblage of the cover at the bottom of the receptacle does not materially alter or impair the appearance of the receptacle.

While I have described my device primarily as a container or box, it will be apparent that in its use and application it constitutes in reality a combination container and vapor diffuser for volatilizable materials. Thus when the cover is in the completely lowered or closed position, volatilization of the material from within the container is substantially prevented, whereas elevation of the cover with respect to the container provides a variable control of the rate of diffusion of vapors from the container.

A practical advantage of the container construction herein disclosed is that the receptacle and cover parts can each be readily fashioned by molding from plastics and similar materials thus minimizing the cost involved and adapting the device for use as a dispensible container. In this connection it will be apparent that if desired, the external contours of the receptacle and cover can be formed or fashioned to provide decorative effects without impairing the functioning of the device as above described.

I wish it to be understood that the foregoing description and accompanying drawing illustrate in an enunciative and non-limitative manner a preferred adaptation of my invention, but without restricting it to the specific details as illustrated and described. Various changes and modifications which may become necessary in practice or are deemed desirable may be made without departing from the scope of my invention, and to the extent that such changes and modifications are embraced by the appended claims, it is to be understood that they constitute part of my invention.

I claim:

1. A container of the class described comprising a circular receptacle having at its center an internally threaded tubular part arranged perpendicularly to the bottom thereof, a disc-shaped cover having centrally thereof a perpendicular pin extending from its lower surface, said pin being of cylindrical contour threaded throughout substantially its entire length and adapted for threaded engagement with said tubular part whereby rotation of said parts provides adjustable support of said parts in different positions of relative movement thereof toward and from each other, interfitting peripheral means on said receptacle and cover for closure of said container in the lowermost position of said cover, and the bore of said tubular part extending completely through said receptacle facilitating detachment of the cover and reassembly as an adjustable supporting base for said receptacle by insertion of the pin thereof through the bottom of said receptacle.

2. A container device as defined in claim 1 wherein the pin on said cover joins said cover in an annular rounded portion and the upper inner periphery of the tubular portion of said receptacle is rounded to closely engage the same in the lowermost position of said cover.

References Cited in the file of this patent

UNITED STATES PATENTS

| | | |
|---|---|---|
| 18,035 | Borrman | Aug. 25, 1857 |
| 180,661 | Sidney | Aug. 1, 1876 |
| 219,357 | Howe | Sept. 9, 1879 |
| 759,030 | Sheaffer | May 3, 1904 |
| 1,114,660 | West | Oct. 20, 1914 |
| 1,737,643 | Conner et al. | Dec. 3, 1929 |
| 2,271,156 | Walker | Jan. 27, 1942 |
| 2,271,943 | Klein et al. | Feb. 3, 1942 |
| 2,522,057 | Owens | Sept. 12, 1950 |

FOREIGN PATENTS

| | | |
|---|---|---|
| 1,698 | Great Britain | 1882 |
| 133,029 | Switzerland | July 16, 1929 |
| 775,248 | France | Oct. 8, 1934 |